(12) United States Patent
McCann et al.

(10) Patent No.: US 10,817,481 B2
(45) Date of Patent: Oct. 27, 2020

(54) MANAGING CONTACT RECORDS BETWEEN SERVICE PROVIDER ACCOUNTS OF A USER

(71) Applicant: Blackberry Limited, Waterloo (CA)

(72) Inventors: Robert Emmett McCann, Seattle, WA (US); Diana Jo Schwend, Seattle, WA (US)

(*) Notice: Subject to any disclaimer, the term of this patent is extended or adjusted under 35 U.S.C. 154(b) by 304 days.

(21) Appl. No.: 13/920,185

(22) Filed: Jun. 18, 2013

(65) Prior Publication Data

US 2014/0372371 A1 Dec. 18, 2014

(51) Int. Cl.
*G06F 16/21* (2019.01)
*G06F 16/25* (2019.01)
*G06Q 10/10* (2012.01)

(52) U.S. Cl.
CPC .............. *G06F 16/21* (2019.01); *G06F 16/25* (2019.01); *G06Q 10/10* (2013.01)

(58) Field of Classification Search
None
See application file for complete search history.

(56) References Cited

U.S. PATENT DOCUMENTS

| | | |
|---|---|---|
| 5,946,647 A | 8/1999 | Miller et al. |
| 6,973,299 B2 | 12/2005 | Apfel |
| 6,990,672 B2 | 1/2006 | Maguire et al. |
| 7,734,577 B2 | 6/2010 | Dunn et al. |
| 7,805,729 B2 | 9/2010 | Maguire et al. |
| 7,836,147 B2 | 11/2010 | Reding et al. |
| 8,275,844 B2 | 9/2012 | Maguire et al. |
| 8,275,846 B2 | 9/2012 | Maguire et al. |
| 2003/0097361 A1 | 5/2003 | Huang et al. |
| 2004/0039779 A1* | 2/2004 | Amstrong ............... G06Q 10/10 709/204 |
| 2008/0168525 A1* | 7/2008 | Heller et al. .................. 725/139 |
| 2008/0261569 A1* | 10/2008 | Britt ..................... G06Q 10/107 455/414.1 |
| 2009/0089342 A1* | 4/2009 | Runstedler et al. .......... 707/204 |
| 2011/0035673 A1 | 2/2011 | Chou et al. |
| 2011/0078184 A1* | 3/2011 | Song et al. ................... 707/770 |
| 2011/0078190 A1* | 3/2011 | Samuel ................. G06Q 10/06 707/780 |
| 2011/0107228 A1 | 5/2011 | Huang |

(Continued)

FOREIGN PATENT DOCUMENTS

EP 2357775 8/2011

OTHER PUBLICATIONS

"AlefSoft—Copy Contacts"—May 4 2012, [retrieved on Feb. 11, 2015], [retrieved from the internet URL:https://web.archive.org/web/20120504174053/http://www.alefsoft.com/copycontacts.php].*

(Continued)

*Primary Examiner* — Giuseppi Giuliani
(74) *Attorney, Agent, or Firm* — Thomas Grzesik; Fleit Intellectual Property Law

(57) ABSTRACT

A user can manage personal contact information in a contacts application across multiple writable service provider accounts with only a minimum of user action required. An update function of the contacts application gives the user the ability to easily copy one or more contact records brought up in the contacts application to writable service provider accounts selectively chosen by the user.

20 Claims, 6 Drawing Sheets

(56) References Cited

U.S. PATENT DOCUMENTS

| | | |
|---|---|---|
| 2011/0197163 A1* | 8/2011 | Jegal et al. ................... 715/811 |
| 2012/0198348 A1 | 8/2012 | Park |
| 2013/0006924 A1 | 1/2013 | Logan et al. |
| 2013/0047089 A1 | 2/2013 | Kulathungam |
| 2013/0067404 A1 | 3/2013 | Morrow et al. |
| 2013/0254673 A1* | 9/2013 | Lee et al. ...................... 715/739 |
| 2014/0094182 A1* | 4/2014 | Sato .............................. 455/450 |

OTHER PUBLICATIONS

European Patent Office, Extended European Search Report, EP 13 17 2540, dated Dec. 4, 2013.
http://download.cnet.com/Contacts-Sync/3000-2369_4-75650285.html, Feb. 27, 2013.

* cited by examiner

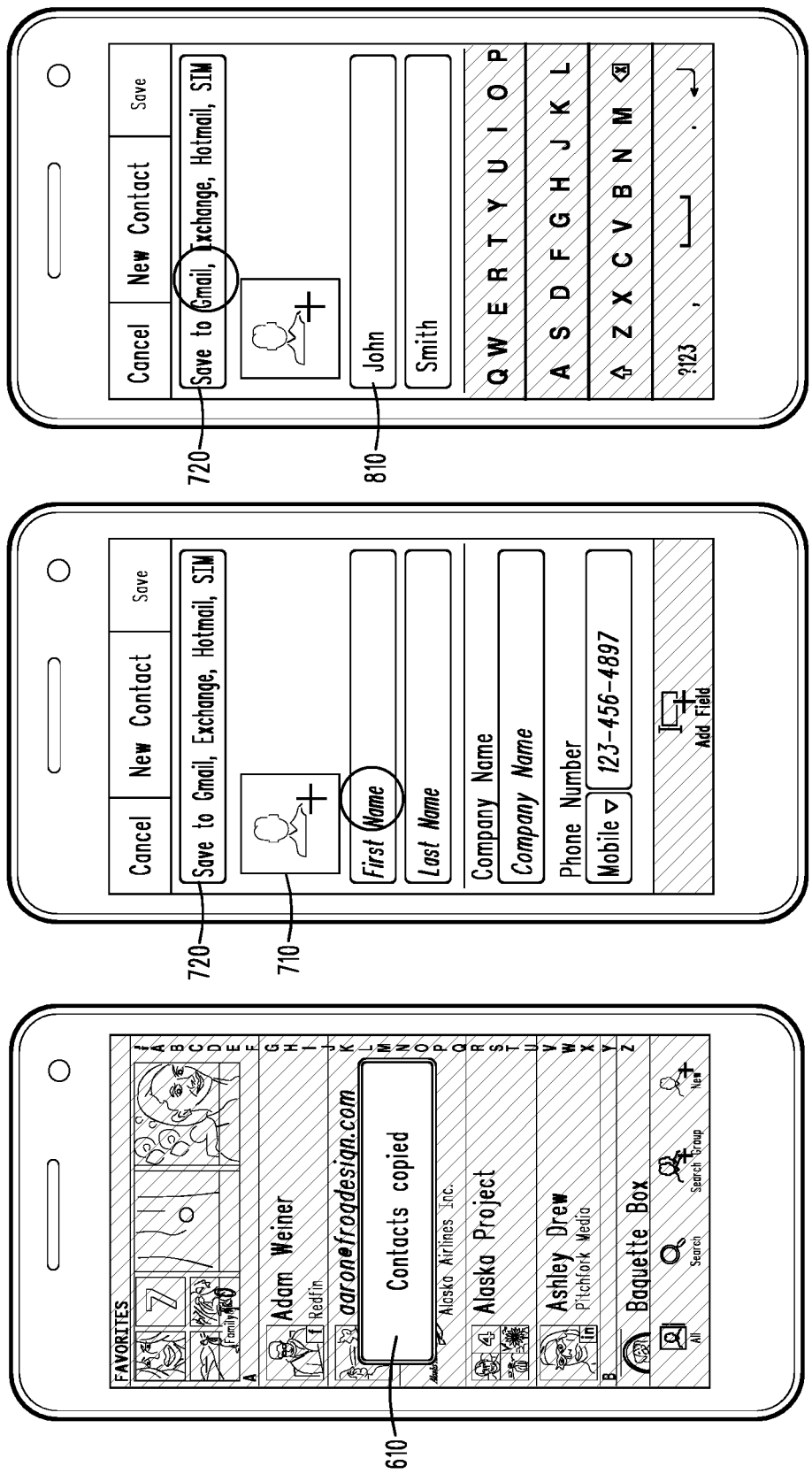

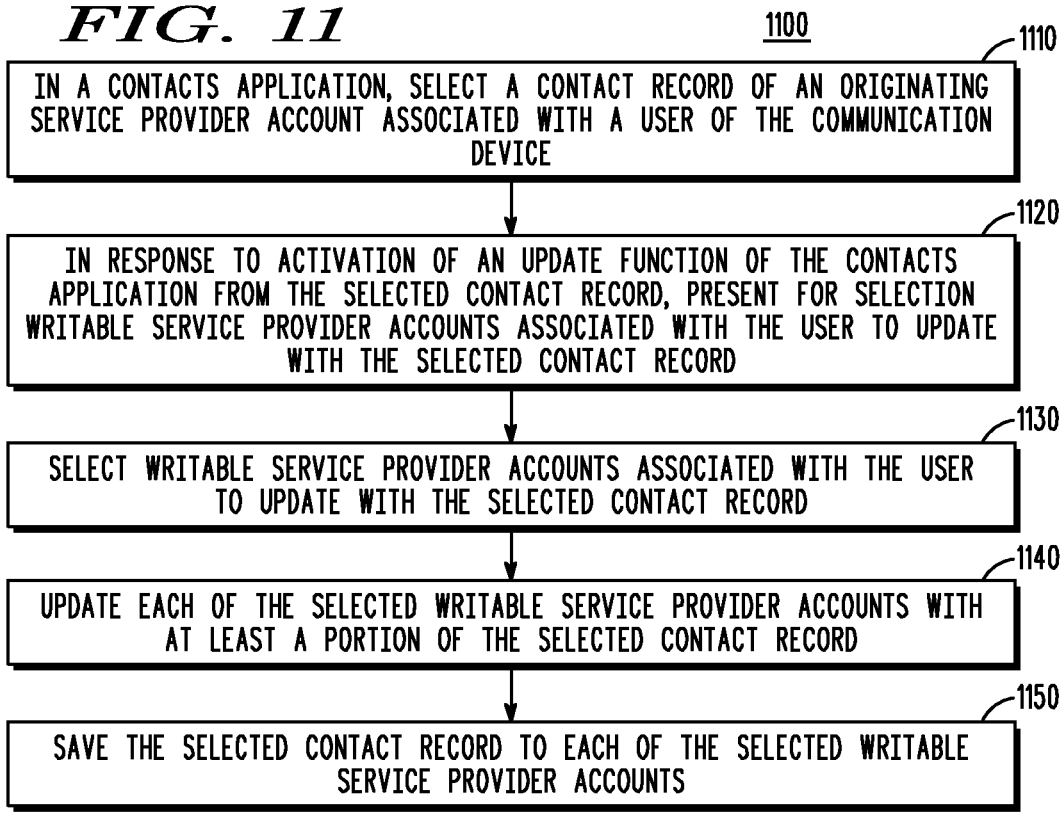
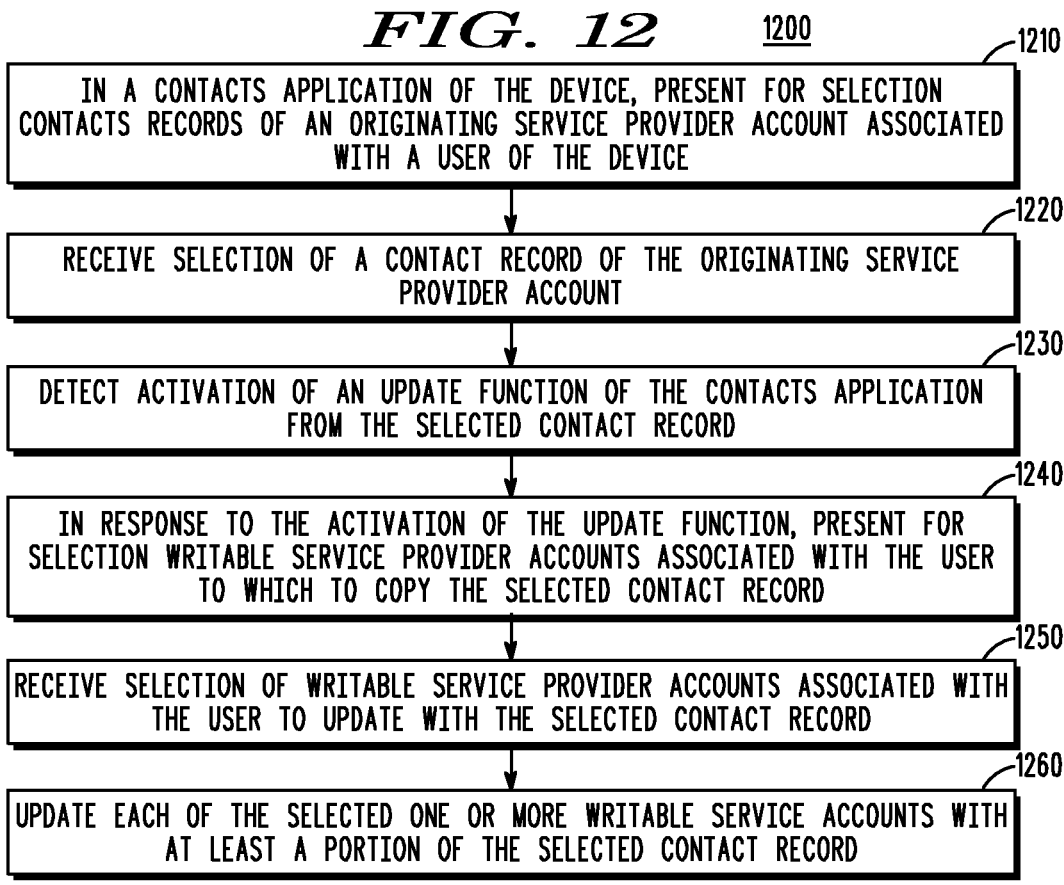

US 10,817,481 B2

MANAGING CONTACT RECORDS BETWEEN SERVICE PROVIDER ACCOUNTS OF A USER

BACKGROUND

Personal information manager (PIM) software applications are computer programs that allow a user to maintain and organize various types of personal information and that provide electronic mail (email) functionality. PIM software applications (or simply "PIM applications") typically maintain personal information in distinct information categories. The information categories that are maintained usually include an email message inbox, an email message outbox, a set of previously transmitted email messages or "sent items", a contacts book containing contact information pertaining to a particular contact such as address, company, emails and phone numbers, a scheduling calendar (or i.e. a set of appointments, notes, and a list of tasks to be completed). PIM applications may be designed for execution by a wireless communication device.

In certain personal information management (PIM) applications, such as a contacts application, contact information about a user's contacts may be provided to the user via a dashboard user interface. It is often the case that information about a particular contact, whether an individual or a company, can and often does come from many sources, including service provider accounts, such as social network sites that have a vast amount of contact information about people and companies, online email accounts, and PIM accounts. When a user wishes to create a contact record or simply update or edit an existing contact record using the contacts application, copying or writing new or updated contact information to each one of various writable service provider accounts can be cumbersome, time-consuming and confusing for the user.

It would be useful to provide a way for a user to effectively, selectively and easily manage their contact information between service provider accounts.

BRIEF DESCRIPTION OF THE DRAWINGS

Example embodiments of the present disclosure will be described below with reference to the included drawings such that like reference numerals refer to like elements and in which:

FIGS. 3 to 10 illustrate user interface screens displayed by a contacts application executing on a communication device in an implementation for copying and saving contact records associated with a user between writable service provider accounts associated with the user, in accordance with various example embodiments of the present disclosure.

FIG. 11 is a flowchart of a method of managing contact records of a user between writable service provider accounts, in accordance with various example embodiments of the present disclosure; and FIG. 12 is a flowchart of a method of managing contact records of a user between writable service provider accounts by a communication device used by the user, in accordance with various example embodiments of the present disclosure.

DETAILED DESCRIPTION

Figure 1:
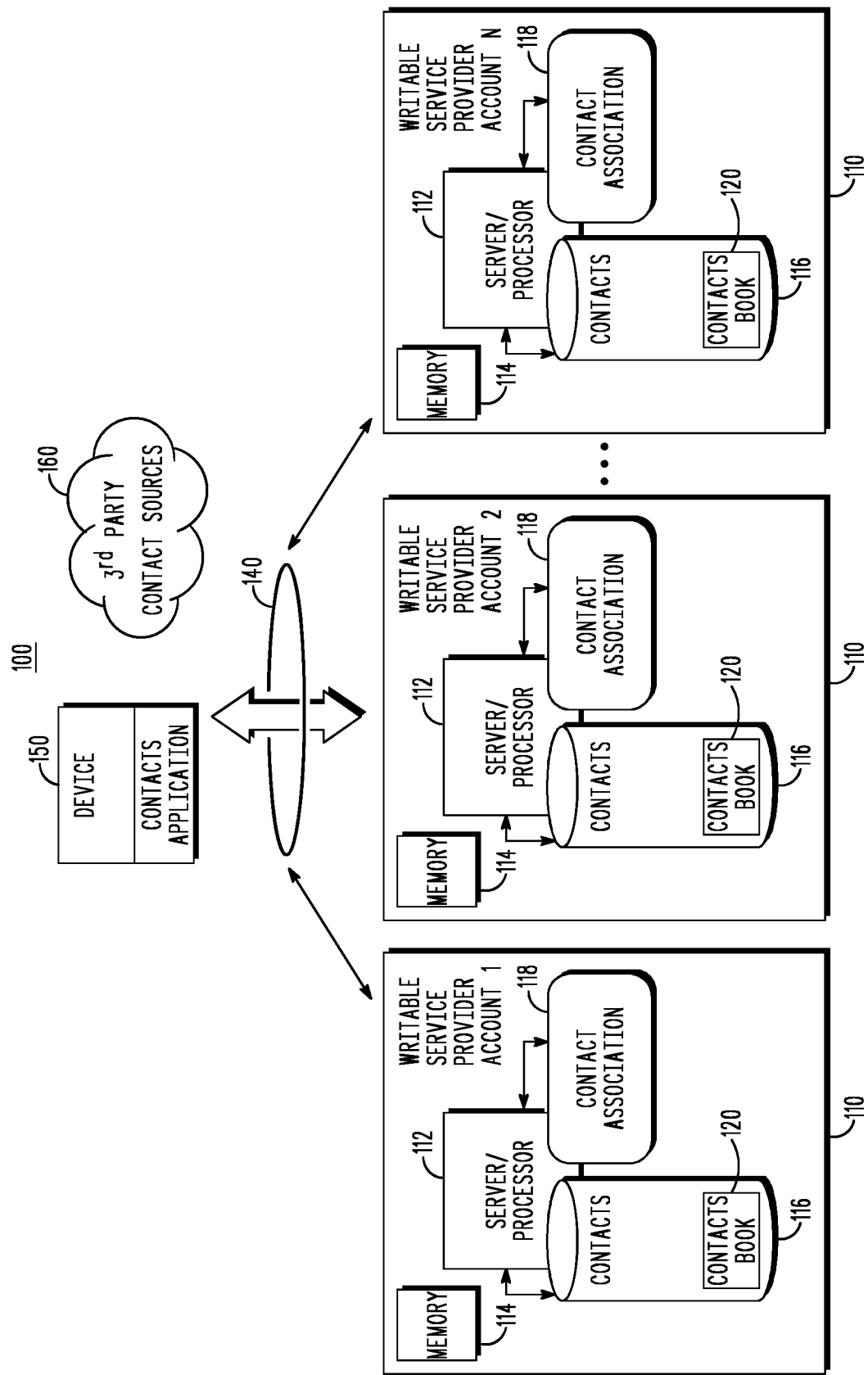
FIG. 1 is a block diagram of a communications system, in accordance with various example embodiments of the present disclosure.

In accordance with the various example embodiments presented herein, a user of a communication device can easily and readily manage contact records stored and maintained in contacts books stored in multiple writable service provider accounts associated with the user. The ability to update contact records brought up in a contacts application running on the communication device using an update function of the contacts application, in which the user can selectively choose which writable service provider accounts are to be updated with selected contact records, enables the user to update his service provider accounts without intervention of another user or administrator. Economies of time are provided as the user can choose to update contact records to all writable service provider accounts to which he is signed on or to some portion thereof. The user's unique contact records can be easily and selectively copied between service provider accounts. The user can choose to update his accounts without sharing personal contact records with another person or account if desired. The embodiments disclosed herein clearly show that a user can manage personal contact information across multiple writable service provider accounts with only a minimum of user action required. The user interface is intuitive and easy to use.

Therefore, in accordance with an example embodiment of the present disclosure, there is provided a method in a communication device, including: in a contacts application, selecting a contact record of an originating service provider account associated with a user of the communication device; in response to activation of an update function of the contacts application from the selected contact record, presenting for selection a plurality of writable service provider accounts associated with the user to update with the selected contact record, each of the plurality of writable service provider accounts having a contacts book associated with the user; selecting one or more of the plurality of writable service provider accounts to update with the selected contact record; and updating one or more of the selected writable service provider accounts with at least a portion of the selected contact record to the contacts book associated with the user for each of the selected one or more writable service provider accounts.

In accordance with another example embodiment of the present disclosure, there is provided a method in a communication device, including: in a contacts application, selecting a contact record of an originating service provider account associated with a user of the communication device; in response to activation of an update function of the contacts application from the selected contact record, presenting for selection a plurality of writable service provider accounts associated with the user to update with the selected contact record, each of the plurality of writable service provider accounts having a contacts book associated with the user; selecting one or more of the plurality of writable service provider accounts to update with the selected contact record; and updating one or more of the selected writable service provider accounts with at least a portion of the selected contact record to the contacts book associated with the user for each of the selected one or more writable service provider accounts.

In accordance with a further example embodiment of the present disclosure, there is provided a method in a communication device, including: in a contacts application, selecting a contact record of an originating service provider account associated with a user of the communication device; in response to activation of an update function of the contacts application from the selected contact record, presenting for selection a plurality of writable service provider accounts associated with the user to update with the selected contact record, each of the plurality of writable service provider accounts having a contacts book associated with the user; selecting one or more of the plurality of writable service provider accounts to update with the selected contact record; and updating one or more of the selected writable service provider accounts with at least a portion of the selected contact record to the contacts book associated with the user for each of the selected one or more writable service provider accounts.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

Referring now to FIG. 1, a block diagram of a distributed communications system 100 is shown. Communications system 100 includes a number (e.g., 1, 2, . . . , N) of service provider accounts 110 that may be provided with contact information from third party contact sources 160 or from communication with communication device 150. Service provider accounts 110 are in communications with communication device 150 via communications network 140 as shown. As shown, third party contact sources 160 may provide information about contacts to the communication device 150 and/or the service provider accounts 110. Although communications network 140 may be the World Wide Web or Internet, and various servers/processors 112 associated with service provider accounts 110 may reside on the World Wide Web, it is understood that servers of the service provider accounts 110 and the communication device 150 may be coupled together by various types of networks, such as local area networks (LANs), other wide area networks (WANs) and regional networks accessed over telephone lines, such as commercial information services. As will be described, each of the service provider accounts 110 may have a contacts book 120 associated with a user of the communication device 150 and accordingly may have a great number of contacts books each associated with various users of various communication devices 150. As used herein, service provider accounts refers to any number of type of accounts, such as online email accounts that may include e.g. Gmail®, Yahoo® mail, Hotmail®, Exchange®, etc.; social network accounts like LinkedIn®, Facebook®, and Twitter®; and personal information manager accounts such as a SIM card of the communication device itself or Microsoft Outlook®.

Communication device 150 is a two-way electronic communication device having at least data and possibly also voice communication capabilities, and the capability to communicate with other communication devices or computer systems, for example, via the Internet. A communication device 150 may further be a mobile or handheld electronic device and may be wireless. Depending on the functionality provided by the communication device 150, in the various examples described herein, the device may be a data communication device, a multiple-mode communication device configured for both data and voice communication, a smartphone, a mobile telephone or a personal digital assistant PDA (personal digital assistant) enabled for wireless communication, or a computer system with a wireless modem. Other examples of communication devices 150 include mobile, or handheld, wireless communication devices such as pagers, cellular phones, cellular smartphones, wireless organizers, wirelessly enabled notebook computers, tablet computing devices, and so forth. Communication device 150 may also be a portable electronic device without wireless communication capabilities, such as a handheld electronic game device, digital photograph album, digital camera, or other device.

Service provider accounts 110 may include one or more servers or processors 112, a memory 114, a contacts database 116 with a contacts book 120 associated with the user of the communication device 150, and a contact association element 118, as shown in FIG. 1. The contacts database 116 may have any number of contacts books 120, each associated with a user of a different communication device 150. A contacts book 120 is associated with a particular user and so will have stored contact records that are unique to the particular user. Each contact record can include information organized in a format having one or more data fields, e.g., a first data field, a second data field, a third data field and a fourth data field, into which data entries may be made. In an exemplary embodiment, the first data field can include a name, the second data field can include an address, the third data field can include a telephone number, and the fourth data field can include an email address. The service of service provider accounts 110 may be provided by a data center, for example, that uses a large number of servers/processors 112 in racks. Server 112 of a service provider account 110 may have a number of different servers, with each server having one or more processors, contacts databases 116, and memories 114. The server 112 may be by way of example, and not limitation, a Network Operations Center (NOC), a Blackberry® Enterprise Server (BES), a mobile device management server, or other central server arrangement that can combine many social networks and manage them collectively. Load balancing between various servers 112 may be employed in example configurations.

While contacts database 116 encompasses the functionality of a contacts database, it is understood that such databases may reside within one or many databases to which a service provider account 110 has access. A contacts database 116 stores contact information available on the Internet, for example. The contacts stored in the contacts database may be acquired from a communication device 150 directly (for example, from a PIM application such as the contacts application executing on the communication device), from a third party contact source 160, such as social network sites that have a vast amount of contact information, or from a user of the communication device 150 electing to provide certain of the user's contacts stored on the device. The service provider account 110 can also directly acquire contact information and store them in the contacts database 116.

In keeping with various examples, a service provider account 110 can acquire contacts from a user's communication device 150 and/or various third party contact sources 160. The contact association element 118 of a service provider account 110 associates contact information with a user's contacts. User contacts may be obtained directly from the communication device 150 and stored in a particular user's contacts book 120. Contact information may also be obtained from a variety of sources on the Internet, including but not limited to Gmail®, Google contacts, social network contacts (such as Facebook®, Twitter®, Linked-In®, etc.). This association of contacts is performed by contact association element 118 of the service 110.

The user can decide whether to opt-in to the service provided by a service provider account 110 or it may be provided automatically. A PIM application, such as a contacts application, that executes on the communication device 150 may prompt the user to decide whether to opt-in, or this may occur when the user interacts with the application, such as changing (editing), adding to, or deleting one or more contact records in a contacts application executing on the communication device. Such methods are further illustrated in the flowcharts of FIGS. 11 and 12 and the graphical user interfaces of FIGS. 3-10 of the drawings, described below.

Figure 2:
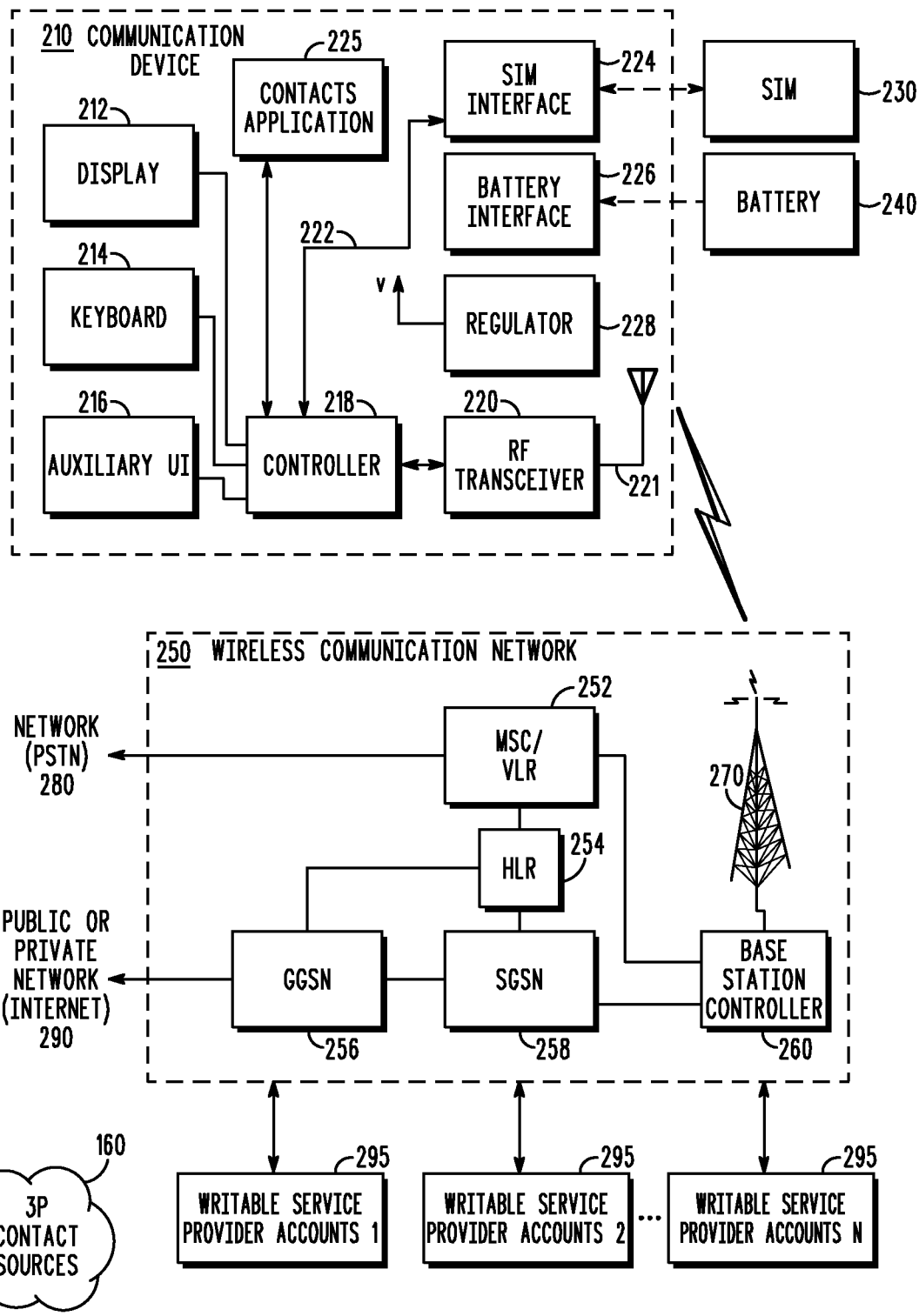
FIG. 2 is a block diagram of a wireless communication system, in accordance with various example embodiments of the present disclosure.
Figure 5:
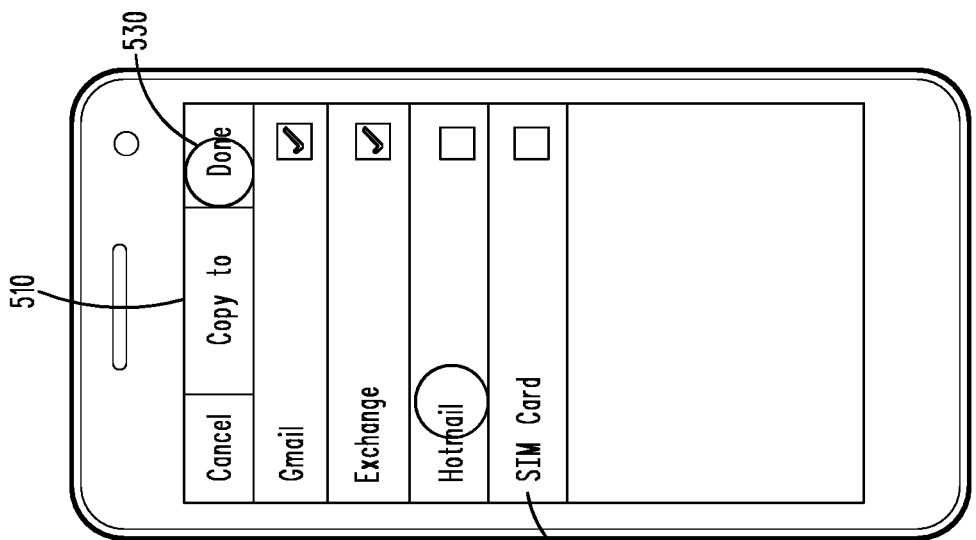
Figure 4:
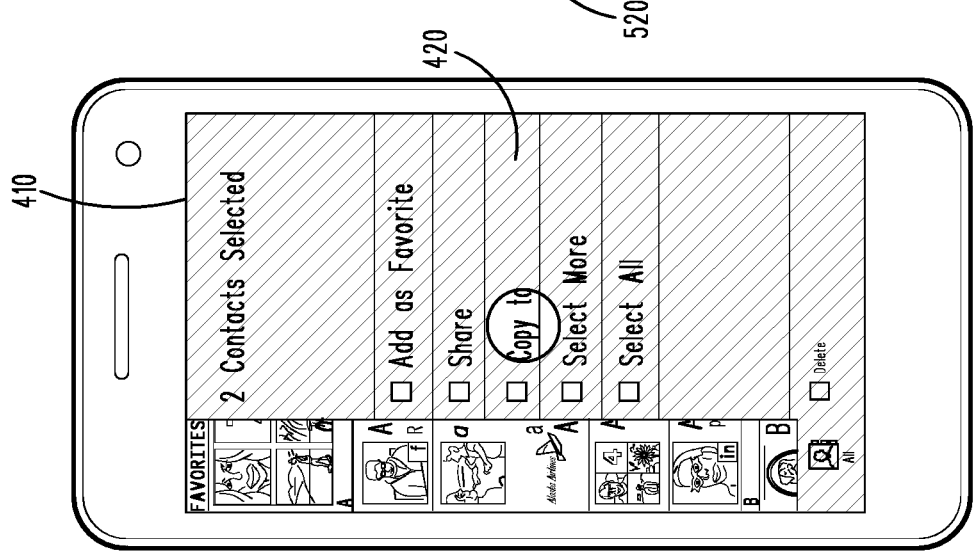

To illustrate an example embodiment system architecture, FIG. 2 shows a block diagram of a wireless communication system 200 which includes a communication device 210, such as a wireless or mobile communication device, which communicates through a wireless communication network 250, to one or more writable service provider accounts 295. Each of the writable service provider accounts 295 may contain a contacts book associated with the user of the communication device 210 and to which a contacts application or other PIM program executing on the communication device 210 may copy contact records from the contacts application of the communication device 210. An example wireless implementation of communication device 210 and a wireless communication network 250 with which it communicates will now be discussed. Communication device 210 has a display 212, a keyboard 214, a contacts application 225, and perhaps one or more auxiliary user interfaces (UI) 216, each of which are coupled to a controller 218. Controller 218 is also coupled to radio frequency (RF) transceiver circuitry 220 and an antenna 221. Controller 218 may be embodied as a central processing unit (CPU) which runs operating system software in a memory component (not shown). Controller 218 will normally control overall operation of communication device 210, whereas signal processing operations associated with communication functions may be performed in RF transceiver circuitry 220. Controller 218 interfaces with display 212 to display received information, stored information, user inputs, and the like. Controller 218 also interfaces with contacts application 225, a PIM program that allows a user to access, add, edit and update contact records specific to the user. As noted previously, the contact records may be stored in a contacts book(s) of one or more writable service provider accounts associated with the user. Keyboard 214, which may be a telephone type keypad or full alphanumeric keyboard, is normally provided for entering data for storage in communication device 210, information for transmission to wireless communication network 250, a telephone number to place a telephone call, commands to be executed on electronic communication device 210, and possibly other or different user inputs.

Communication device 210 sends communication signals to and receives communication signals from wireless communication network 250 over a wireless link via antenna 221. RF transceiver circuitry 220 performs functions similar to those of a tower station 270 and a base station controller (BSC) 260, including for example modulation/demodulation and possibly encoding/decoding and encryption/decryption. It is also contemplated that RF transceiver circuitry 220 may perform certain functions in addition to those performed by BSC 260. It will be apparent to those skilled in art that RF transceiver circuitry 220 will be adapted to particular wireless network or networks in which communication device 210 is intended to operate. When communication device 210 is fully operational, an RF transmitter of RF transceiver circuitry 220 is typically keyed or turned on only when it is sending to the network 250, and is otherwise turned off to conserve resources. Similarly, an RF receiver of RF transceiver circuitry 220 is typically periodically turned off to conserve power until it is needed to receive signals or information (if at all) during designated time periods.

Communication device 210 includes a battery interface 226 for receiving one or more rechargeable batteries 240. Battery 240 provides electrical power to electrical circuitry in communication device 210, and battery interface 226 provides for a mechanical and electrical connection for battery 240. Battery interface 226 is coupled to a regulator 228 which regulates power to the device. Communication device 210 may be a handheld portable communication device, which includes a housing (e.g. a plastic housing) which carries and contains the electrical components of communication device 210 including battery 240. Communication device 210 operates using a Subscriber Identity Module (SIM) 230 which is connected to or inserted in communication device 210 at a SIM interface 224. SIM 230 is one type of a conventional "smart card" used to identify an end user (or subscriber) of communication device 210 and to personalize the device, among other things. Without SIM 230, the communication device terminal is not fully operational for communication through wireless communication network 250. By inserting SIM 230 into communication device 210, an end user can have access to any and all of his/her subscribed services. SIM 230 generally includes a processor and memory for storing information. Since SIM 230 is coupled to SIM interface 224, it is coupled to controller 218 through communication lines 222. In order to identify the subscriber, SIM 230 contains some user parameters such as an International Mobile Subscriber Identity (IMSI). An advantage of using SIM 230 is that end users are not necessarily bound by any single physical mobile communication device. SIM 230 may store additional user information for the communication device 210 as well, including datebook (or calendar) information and recent call information.

Communication device 210 may consist of a single unit, such as a data communication device, a cellular telephone, a multiple-function communication device with data and voice communication capabilities, a personal digital assistant (PDA) enabled for wireless communication, or a computer incorporating an internal modem. Communication device 210 may be a handheld portable communication device which includes a housing (e.g. a plastic housing) which carries and contains the electrical components of communication device 210. Alternatively, communication device 210 may be a multiple-module unit including a plurality of separate components, including but in no way limited to a computer or other device connected to a wireless modem. In particular, for example, RF transceiver circuitry 220 and antenna 221 may be implemented as a radio modem unit that may be inserted into a port on a laptop computer. In this case, the laptop computer would include display 212, keyboard 214, one or more auxiliary UIs 216, and controller 218 embodied as the computer's CPU. It is also contemplated that a computer or other equipment not normally capable of wireless communication may be adapted to connect to and effectively assume control of RF transceiver circuitry 220 and antenna 221 of a single-unit device such as one of those described above.

Communication device 210 communicates in and through wireless communication network 250. Wireless communication network 250 may be a cellular telecommunications network. In an example embodiment, wireless communication network 250 is configured in accordance with General Packet Radio Service (GPRS) and a Global Systems for Mobile (GSM) technologies. Today, such a mobile communication device may further operate in accordance with Enhanced Data rates for GSM Evolution (EDGE) or Enhanced GPRS (EGPRS), as described in the Background section. In such environment, wireless communication network 250 includes a base station controller (BSC) 260 with an associated tower station 270, a Mobile Switching Center (MSC) 252, a Home Location Register (HLR) 254, a Serving General Packet Radio Service (GPRS) Support Node (SGSN) 258, and a Gateway GPRS Support Node (GGSN) 256. MSC 252 is coupled to BSC 260 and to a landline network, such as a Public Switched Telephone Network (PSTN) 280. SGSN 258 is coupled to BSC 260 and to GGSN 256, which is in turn coupled to a public or private data network 290 (such as the Internet). HLR 254 is coupled to MSC 252, SGSN 258, and GGSN 256.

Station 270 is a fixed transceiver station, and station 270 and BSC 260 may be referred to as transceiver equipment. The transceiver equipment provides wireless network coverage for a particular coverage area commonly referred to as a "cell". The transceiver equipment transmits communication signals to and receives communication signals from mobile communication devices within its cell via station 270. The transceiver equipment normally performs such functions as modulation and possibly encoding and encryption of signals to be transmitted to the mobile communication device in accordance with particular, usually predetermined, communication protocols and parameters, under control of its controller. The transceiver equipment similarly demodulates and possibly decodes and decrypts, if necessary, any communication signals received from communication device 210 within its cell. Communication protocols and parameters may vary between different networks. For example, one network may employ a different modulation scheme and operate at different frequencies than other networks.

The wireless link shown in communication system 200 of FIG. 2 represents one or more different channels, typically different radio frequency (RF) channels, and associated protocols used between wireless communication network 250 and communication device 210. An RF channel is a limited resource to be conserved, due to limits in overall bandwidth and a limited battery power of communication device 210. Those skilled in art will appreciate that a wireless network in actual practice may include hundreds of cells, each served by a station 270 (i.e. or station sector), depending upon desired overall expanse of network coverage. All pertinent components may be connected by multiple switches and routers (not shown), controlled by multiple network controllers.

For all communication devices 210 registered with a network operator, permanent data (such as communication device 210 user's profile) as well as temporary data (such as communication device's 210 current location) are stored in HLR 254. In case of a voice call to communication device 210, HLR 254 is queried to determine the current location of communication device 210. A Visitor Location Register (VLR) of MSC 252 is responsible for a group of location areas and stores the data of those mobile communication devices that are currently in its area of responsibility. This includes parts of the permanent communication device data that have been transmitted from HLR 254 to the VLR for faster access. However, the VLR of MSC 252 may also assign and store local data, such as temporary identifications. Optionally, the VLR of MSC 252 can be enhanced for more efficient co-ordination of GPRS and non-GPRS services and functionality (e.g. paging for circuit-switched calls which can be performed more efficiently via SGSN 258, and combined GPRS and non-GPRS location updates).

Serving GPRS Support Node (SGSN) 258 is at the same hierarchical level as MSC 252 and keeps track of the individual locations of communication devices. SGSN 258 also performs security functions and access control. Gateway GPRS Support Node (GGSN) 256 provides interworking with external packet-switched networks and is connected with SGSNs (such as SGSN 258) via an IP-based GPRS backbone network. SGSN 258 performs authentication and cipher setting procedures based on algorithms, keys, and criteria (e.g. as in existing GSM). In conventional operation, cell selection may be performed autonomously by communication device 210 or by the transceiver equipment instructing communication device 210 to select a particular cell. Communication device 210 informs wireless communication network 250 when it reselects another cell or group of cells.

In order to access GPRS services, communication device 210 first makes its presence known to wireless communication network 250 by performing what is known as a GPRS "attach". This operation establishes a logical link between communication device 210 and SGSN 258 and makes communication device 210 available to receive, for example, pages via SGSN, notifications of incoming GPRS data, or SMS messages over GPRS. In order to send and receive GPRS data, communication device 210 assists in activating the packet data address that it wants to use. This operation makes communication device 210 known to GGSN 256; interworking with external data networks can thereafter commence. User data may be transferred transparently between communication device 210 and the external data networks using, for example, encapsulation and tunneling. Data packets are equipped with GPRS-specific protocol information and transferred between communication device 210 and GGSN 256.

Referring now to FIGS. 3 to 10, examples of an implementation for carrying out the methodology of updating writable service provider accounts associated with a user of communication device are illustrated. In the examples shown in these drawings, a mobile device, i.e. smartphone, with a touch-screen display, is illustrated in these drawings. Selection of an element displayed on the touch-screen display is indicated by a selection circle that shows the selection. The methodology presented herein may be implemented in communications device 150 of FIG. 1 or communication device 210 of FIG. 2.

Figure 3:
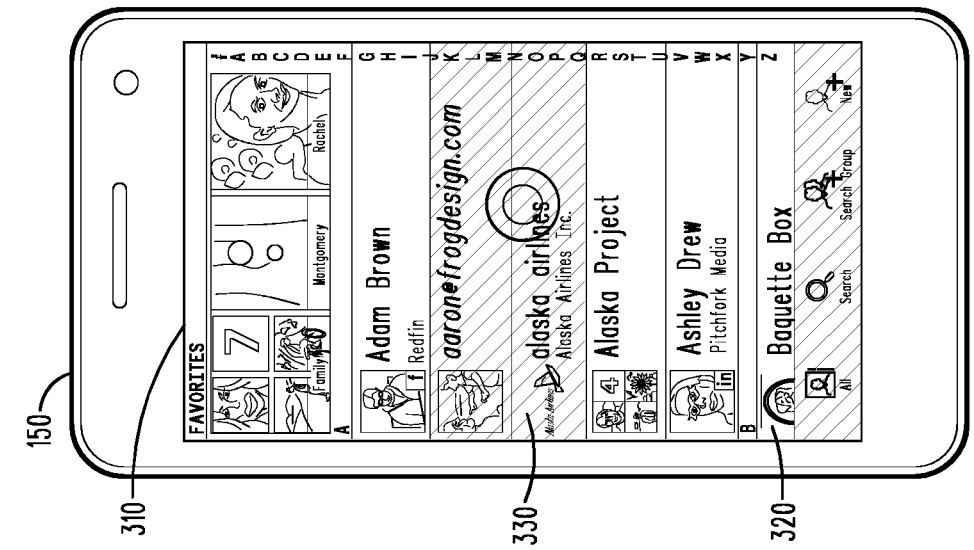

In an example embodiment, in FIG. 3 a window 310 of a contacts application displayed on a display of the communication device, such as a touch screen display, as shown here, may include a number of contacts or contact records displayed in a contact list 320. In the particular example shown, the "A" contacts are displayed under the letter "A" under a "FAVORITES" section. There are five contacts listed under "A" and it can be discerned, from the selection circle indicating two contacts 330 and the shaded area of these same two contacts, that the second and third contacts have been selected by the user touching the touchscreen. While two contact records are selected in this example, it will be understood and appreciated that only one contact or more than two contacts may be chosen as well. The user can select one or more existing contacts from the communication device. The data of this contact, i.e. the contact record, may be only currently available on a single remote server of a particular writable service provider account associated with the user of the communication device, referred to as an originating service provider account associated with the user of the communication device. Or, the user, when creating a contact record of a new contact, may be presented the option to select one or more writable service provider accounts linked to the communication device by virtue of the user being signed into these accounts and save the data to those service provider accounts when creating the new contact record.

Thus, the contact records are stored in one or more service provider accounts associated with a user of the communication device. Accordingly, a user may have contact data that exists in a single remote server of a particular service provider account and wish to have this data copied onto other, user-controlled servers/service provider accounts. According to the principles of this disclosure, this ability is provided by the update function of the contacts application, illustrated as a copy-to function, described below. As used herein, the term service provider account refers to any number of type of accounts, such as online email accounts that may include Gmail®, Yahoo® mail, Hotmail®, Exchange®, etc.; social network accounts like LinkedIn®, Facebook®, and Twitter®; and personal information manager accounts such as a SIM card of a communication device itself or Microsoft Outlook®. Each of these service provider accounts has a contacts book or list associated with a particular user, such as a user of the communication device. Moreover, a service provider account is considered writable where the user is signed into the account via one or more network connections between the communication device and a network on which the plurality of writable service provider accounts reside. For example, it will be understood that online email accounts and social network accounts like those enumerated above, reside on the web or Internet. Thus, in FIG. 3, it can be seen that one or more contact records of a number of contact records stored in a contacts book of an originating service provider account may be displayed for selection in a contacts application of the communication device.

Selection of one or more contact records in FIG. 3 in the contacts application causes a crosscut menu 410 to appear in which actionable operations are presented. Crosscut menu 410 is a menu pane that overlaps at least in part, and that obscures at least a portion of, the window 310 of the contacts application. The crosscut menu 410 of FIG. 4 has a number of selectable functions that may be selected by a user of the device, including an Add as Favorite function, a Share Function, a Copy-to function, a Select More function, a Select All function, and a Delete function. Other functions, or more or less functions, may be displayed in the crosscut menu. As shown in this particular implementation, crosscut menu 410 obscures a major portion of the contacts list 320 previously displayed in FIG. 3, may move from right to left over a portion of the displayed screen, and displays a number of functions of the contacts application. However, other presentations and configurations of the crosscut menu may be employed without departing from the scope or principles presented herein.

As indicated by the selection circle, the copy-to function 420 has been selected by a user of the device. In response to activation of the copy-to function 420, a number of writable service provider accounts 520 associated with the user and to which the selected contact record may be copied are presented for selection by the user of the device in a copy-to window 510 in FIG. 5. The copy-to window 510 has the copy-to function displayed as a tab at the top of the window, as well as cancel and done tabs as shown.

The screen presented in the copy-to window 510 shows all available writable service provider accounts that the device owner/user is currently signed into, including the device SIM card, if present. The list of selectable writable service provider accounts includes the account in which the selected contact record(s) are stored and, as previously mentioned, each of the selectable writable service provider accounts has a contacts book associated with the user. The list of writable service provider accounts 520 allows selection by the user of one account or multiple accounts. In a default action of the contacts application, each writable service provider account that already has a contact record for the selected contact is selected by default. The user may choose to deselect certain writable service provider accounts by tapping the account to remove the checkmark from an account. In the example illustration of FIG. 5, it can be seen that the user has deselected the Hotmail® and SIM Card accounts, as they are not selected, leaving the Gmail® and Exchange® accounts selected as shown. If the user deselects a writable service provider account that already has the selected contact in its respective contacts book, the record in the contacts book of that provider is left alone (not deleted) and remains linked to the existing contact record but will not be updated with data from a unified table of the selected contact.

After the user has selected all of the writable service provider accounts to which to copy the selected contact record(s), the user can tap the "Done" tab 530 at the top of the copy-to window 510. The selected contact record(s) are then copied to the contacts book associated with the user for each of the selected writable service provider accounts. This may occur, for example, by automatically establishing communication with a contact record associated with a target, writable service provider account in response to pressing the done tab, where pressing the done tab is interpreted as a command to update the selected writable service provider accounts. Ideally, all data from the unified contact, as the selected and copied record may be referred, is written to the selected writable service provider accounts. Alternatively, all, some or at least a portion of the information of the contact record is written to the selected writable target service provider accounts. In other words, if the information of the contact record is organized into a number of data fields, then all, some or at least a portion of the number of data fields is written to the selected writable target service provider accounts depending upon the arrangement and organization of data fields in the respective contact books at the selected writable target service provider accounts. Providers with existing records that correspond to the selected contact record are updated and new contact records are created on any new providers. Any new contact records are linked to the existing, selected contact record.

If a selected contact record is already stored in a writable service provider account selected in the copy-to window, than the copy of that record just silently fails, meaning that the user is not notified that the copy of a particular contact record did not occur. In this way, contact records are not duplicated, but contact records not previously stored in the contacts book of selected writable service provider accounts are copied over.

Next, at FIG. 6, the user may be provided notification that the selected contact record has been copied to a contacts book of a writable service provider account associated with the user. In this particular example, a "toast" notification 610 appears on the screen of the device. The toast notification appears in order to provide feedback to the user that the copy-to function has been successfully completed or is occurring in the background. In the future, as contact records are edited or added to, the contact records will remain synchronized to or in match with the accounts selected by the user in the copy-to window 510. The user may elect to change the selected writable service provider accounts at any time.

In accordance with further embodiments of the present disclosure, in an edit window or screen 710 of the contacts application of the device of FIG. 7, there may optionally be provided a button corresponding to a save-to function of the contacts application. The save-to button 720 allows the user to select multiple accounts for synchronization of the selected contact data after saving. Since all writable service provider accounts are normally synchronized by default, all writable service provider accounts can be shown for deselection by the user if desired. In this particular example, the Save-to button 720 lists Gmail®, Exchange®, Hotmail®, SIM as writable service provider accounts that the contact record is to be synched with. It will be seen in FIG. 10 that the writable service provider accounts to which a record is to be saved may be selectively changed by the user. Selection of a contact record in FIG. 7 brings up a particular contact record 810 in FIG. 8.

As indicated by the selection circle in the drawing, the user has tapped the save-to button 720. This activates the save-to functionality of the contacts application and causes a save-to window 910 to be displayed on the touch screen of the device in FIG. 9. This sheet that appears displays all writable accounts that the device owner is currently signed into, including the SIM card, if present. The list of selectable writable service provider accounts 920 allows selection of multiple accounts. As all of the writable service provider accounts are selected by the contacts application by default, the user can tap to deselect accounts that are not to be updated with at least some of the selected contact record. As shown in this example, the user has deselected the Hotmail® and SIM card accounts, as they are not checked with a checkmark. The user can then tap the Done tab of the save-to window, as indicated by the select circle in the drawing.

Figure 10:
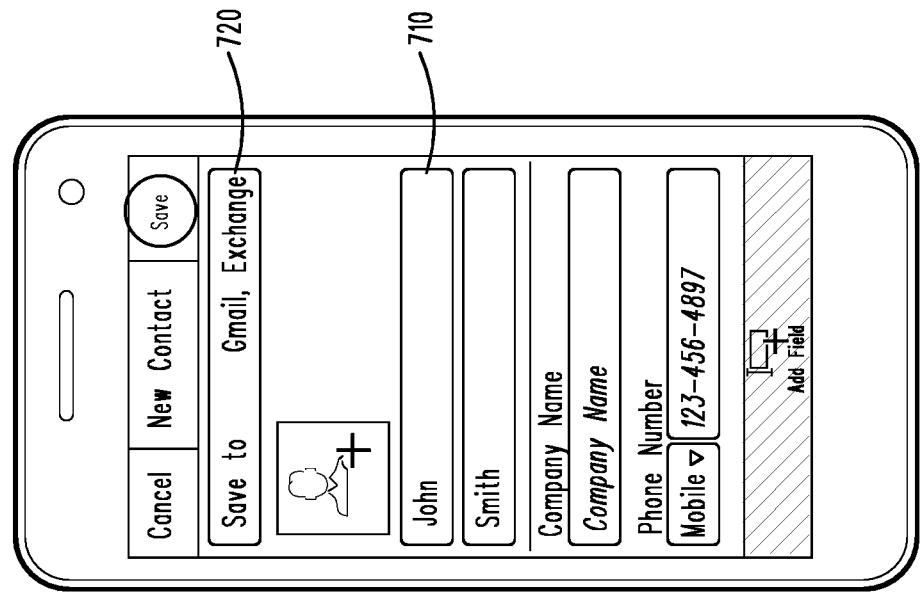
Figure 9:
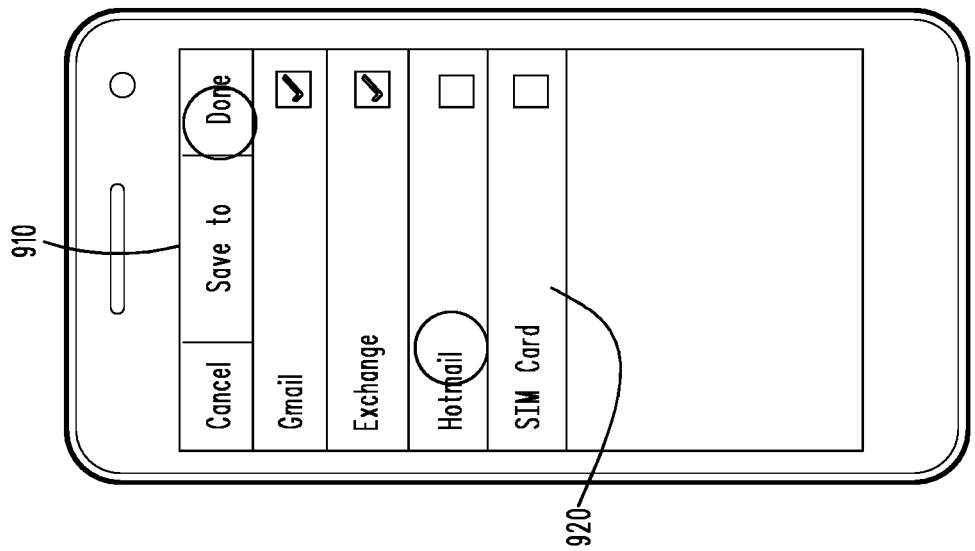

Tapping the Done tab in FIG. 9 causes the contacts application to go back to the edit screen. In FIG. 10, the edit window 710 of the contacts application is displayed again on the device touch screen. It can be seen that the Save-to button has been updated to reflect the changes: only the Gmail and Exchange writable service provider accounts are now listed on Save-to button 720. The user can tap the Save tab to save as indicated by the select circle on the Save tab and close the edit screen.

With regard to deletions of a selected contact record, the contact records in all writable service provider accounts are deleted from the account's respective contacts book when the user chooses to delete the selected contact record. The user would need to unmerge so as to separate the records before deleting in order to delete the contact records from specific service provider accounts.

Referring now to FIG. 11, a methodology in accordance with various example embodiments disclosed herein is provided. In flowchart 1100, at Block 1110 in a contacts application of the communication device, a contact record of an originating service provider account associated with a user of the communication device is selected. As previously described, the contact record may exist in a contacts book of the originating service provider account. At Block 1120, in response to activation of an update function of the contacts application, such as the copy-to function described herein, from the selected contact record, writable service provider accounts associated with the user to which to copy the selected contact record are presented for selection. At Block 1130, writable service provider accounts associated with the user that are to be updated with some or all of the selected contact record are selected. At Block 1140, the selected writable service provider accounts are updated with at least a portion of the selected contact record. As discussed, the selected contact record may be copied to the contacts book associated with the user for each of the selected writable service provider accounts. The selected contact record or a portion thereof may be saved, such as in a corresponding contacts book, to each of the selected writable service provider accounts at Block 1150.

In FIG. 12, a methodology of the communication device in accordance with various example embodiments disclosed herein is provided. In flowchart 1200, at Block 1210, in a contacts application of the communication device, contact records of an originating service provider account associated with a user of the communication device are presented for selection. The contact records may exist in a contacts book of the originating service provider account. Next, the device receives selection of one or more contact records of the originating service provider account at Block 1220. The device detects activation of an update function, such as the copy-to function of the contacts application described herein, from the selected contact record at Block 1230. In response to the activation of the update function, writable service provider accounts associated with the user to which to copy the selected contact record are presented for selection at 1240. The device can then receive selection of one or more of the writable service provider accounts associated with the user to update with the selected contact record at Block 1250. Next, at Block 1260 each of the selected one or more writable service provider accounts is updated with at least a portion of the selected contact record as previously described.

While the blocks including the methods are shown as occurring in a particular order, it will be appreciated by those skilled in the art that many of the blocks are interchangeable and can occur in different orders than that shown without materially affecting the end results of the methods.

It can be seen from the foregoing description that a user can manage personal contact information across multiple writable service provider accounts with only a minimum of user action required. The user interface is intuitive and easy to use. Contact records stored and maintained in contacts books stored in multiple writable service provider accounts associated with the user can be easily updated, saved and edited with minimum time and effort on the part of the user from a contacts application on a communication device used by the user. Advantageously, the ability to copy contact records brought up in a contacts application running on the communication device using a copy-to function of the contacts application in which the user can selectively choose to which writable service provider accounts contact records are to be copied or written enables the user to update his service provider accounts without intervention of another user or administrator.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method in a graphical user interface of a communication device for facilitating management of contact records, comprising:
    in a contacts application user interface, displaying a plurality of contact records contemporaneously with each other, wherein each of at least two contact records in the plurality of contact records are from a different originating service provider account associated with a user of the communication device, and wherein each contact record in the plurality of contact records is a different contact record;
    receiving a selection from the user through the contacts application user interface of at least one contact record from the plurality of contact records;
    opening the at least one contact record in response to receiving the selection;
    determining if an input has been provided by the user through the contacts application user interface and from within the opened contact record;
    activating an update function of the contacts application in response to determining that the input has been provided by the user from within the opened contact record;
    in response to the update function being activated, identifying a plurality of service provider accounts each having a contacts book associated with the user;
    determining if the user is currently signed into each service provider account of the plurality of service provider accounts;
    identifying a set of writable service provider accounts and a set of non-writable service provider accounts from the plurality of service provider accounts in response to determining if the user is currently signed into each service provider account of the plurality of service provider accounts, wherein the user is currently signed into the writable service provider service provider accounts and the user is not currently signed in to the non-writable service provider accounts;
    in response to identifying both the writable and non-writable sets of service provider accounts, presenting, in the contacts application user interface for selection, the set of writable service provider accounts that has been identified to update with the selected contact record, wherein the non-writable sets of service provider accounts are not presented in the contacts application user interface;
    automatically determining that the set of writable service provider accounts comprises one or more writable service provider accounts failing to comprise a contact record corresponding to the least one contact record that has been selected and further comprises a plurality of writable service provider accounts comprising a contact record corresponding to the least one contact record that has been selected;
    automatically selecting, within the contacts application user interface, only the plurality of writable service provider accounts for updating based on the selected at least one contact record based on the automatic determination; and
    updating the set of writable service provider accounts with at least a portion of the selected at least one contact record to the contacts book associated with the user for each of the set of writable service provider accounts.

2. The method of claim 1, wherein selecting the at least one contact record comprises selecting a plurality of contact records stored in a contacts book of each of the different originating service provider accounts associated with the user; and
    in response to automatically selecting the plurality of service provider accounts to which to copy the selected at least one contact record, copying the at least one contact records to the contacts book associated with the user for each of the set of writable service provider accounts.

3. The method of claim 1, wherein the set of writable service provider accounts comprises one or more online accounts of the user which the user is signed into via a network connection between the communication device and the network on which at least one of the different originating service provider accounts reside.

4. The method of claim 1, wherein activation of the update function comprises activating the update function in a menu pane of the contacts application that appears in response to selecting the contact record.

5. The method of claim 1, further comprising
    displaying for selection the set of writable service provider accounts in a copy-to window of the contacts application user interface; and
    in response to a selection in the copy-to window of the set of writable service provider accounts, copying the selected at least one contact record to the set of writable service provider accounts.

6. The method of claim 1, further comprising:
    in response to activation of the update function of the contacts application automatically updating the selected at least one contact record to all of the automatically selected set of writable service provider accounts associated with the user in a default action of the contacts application without the user manually selecting any of the set of writable service provider accounts.

7. The method of claim 1, wherein activation of the update function comprises a user pressing a copy-to button on a touch screen of the communication device.

8. The method of claim 7, wherein a default action of the contacts application comprises automatic selection of the set of writable service provider accounts displayed in a copy-to window of the contacts application user interface, the copy-to window displayed in response to the user pressing the copy-to-button.

9. The method of claim 8, further comprising providing for deselection by the user of one or more of the set of writable service provider accounts displayed in the copy-to window.

10. The method of claim 1, further comprising from an edit window of the contacts application user interface for the contact record:
responsive to activation of a save-to function displayed in the edit window, displaying the set of writable service provider accounts associated with the user; and
in response to selection of one or more of the set of writable service provider accounts, saving to the selected one or more of the set writable service provider accounts at least a portion of the selected at least one contact record.

11. The method of claim 10, wherein activation of the save-to function comprises a user pressing a save-to button on a touch screen of the communication device.

12. The method of claim 10, wherein a default action of the contacts application comprises selection of all of the set of writable service provider accounts displayed in the edit window.

13. The method of claim 12, further comprising providing for deselection by the user of one or more of the set of writable service provider accounts displayed in the edit window.

14. The method of claim 1, wherein the user is signed into each of the set of writable service provider accounts via one or more network connections between the communication device and a network on which the set of writable service provider accounts reside.

15. The method of claim 1, wherein a writable service provider account of the set of writable service provider accounts is a SIM card of the communication device.

16. The method of claim 1, further comprising providing notification that the selected at least one contact record has been copied to the contacts book of each writable service provider account of the plurality of writable service provider accounts.

17. The method of claim 1, wherein the contacts application resides on the communication device.

18. The method of claim 1, wherein the selected at least one contact record exists in a contacts book of at least one of the different originating service provider accounts.

19. The method of claim 1, wherein at least one of the different originating service provider accounts is one of the plurality of service provider accounts.

20. A method in a graphical user interface of a communication device for facilitating management of contact records, comprising:
in a contacts application user interface of the communication device, presenting for selection a plurality of contacts records from a plurality of originating service provider accounts associated with a user of the communication device;
receiving a selection from the user through the contacts application user interface of at least one contact record of the plurality of contact records from at least one of the originating service provider accounts;
opening the at least one contact record in response to receiving the selection;
determining if an input has been provided by the user through the contacts application user interface and from within the selected opened at least one contact record;
activating an update function of the contacts application in response to determining that the input has been provided by the user from within the opened contact record;
in response to the activation of the update function, identifying a plurality of service provider accounts associated with the user;
determining if the user is currently signed into each service provider account of the plurality of service provider accounts;
identifying a set of writable service provider accounts and a set of service non-writable service provider accounts from the plurality of service provider accounts in response to determining if the user is currently signed into each service provider account of the plurality of service provider accounts, wherein the user is currently signed into the writable service provider service provider accounts and the user is not currently signed in to the non-writable service provider accounts;
in response to identifying both the writable and non-writable sets of service provider accounts, presenting, in the contacts application user interface for selection, the set of writable service provider accounts associated to which to copy the selected at least one contact record, the set of writable service provider having a contacts book associated with the user, wherein the non-writable sets of service provider accounts are not presented in the contacts application user interface;
automatically determining that the set of writable service provider accounts comprises one or more writable service provider accounts failing to comprise a contact record corresponding to the least one contact record that has been selected and further comprises a at least one writable service provider accounts comprising a contact record corresponding to the least one contact record that has been selected;
automatically selecting, within the contacts application user interface, the at least one first writable service provider account for updating based on the selected at least one contact record based on the automatic determination, wherein the automatic selection changes a visual representation of the first writable service provider account indicating its selection;
receiving a selection from the user through the contacts application user interface of at least a second writable service provider account from the set of writable service provider accounts associated with the user to update with the selected at least one contact record; and
after the first and second writable service provider accounts having been selected, updating at least each of the first and second writable service provider accounts with at least a portion of the selected at least one contact record, wherein the updating comprises
selecting a first set of data fields of the selected at least one data contact record based on an arrangement and organization of data fields in the first writable service provider account to update the first writable service provider account, and selecting a second set of data fields of the selected at least one data contact record based on an arrangement and organization of data fields in the second writable service provider account to update the second writable service provider account, and wherein the first set of data fields are different from the second set of data fields.

* * * * *